United States Patent
Lindig et al.

(10) Patent No.: US 9,324,202 B2
(45) Date of Patent: Apr. 26, 2016

(54) METHOD AND SYSTEM FOR PROVIDING LOCATION-BASED SERVICES

(71) Applicants: Clemens Lindig, Groedig/Salzburg (CH); Thomas Schlechter, Groedig/Salzburg (CH); Jorge Clemente, Groedig/Salzburg (CH); Reinhard Surkau, Groedig/Salzburg (CH)

(72) Inventors: Clemens Lindig, Groedig/Salzburg (CH); Thomas Schlechter, Groedig/Salzburg (CH); Jorge Clemente, Groedig/Salzburg (CH); Reinhard Surkau, Groedig/Salzburg (CH)

(73) Assignee: SKIDATA AG, Groedig/Salzburg (AT)

( * ) Notice: Subject to any disclaimer, the term of this patent is extended or adjusted under 35 U.S.C. 154(b) by 0 days.

(21) Appl. No.: 14/452,558

(22) Filed: Aug. 6, 2014

(65) Prior Publication Data
US 2015/0091726 A1    Apr. 2, 2015

(30) Foreign Application Priority Data
Aug. 6, 2013  (EP) .................................... 13179395

(51) Int. Cl.
*G07C 9/00* (2006.01)
*G06Q 20/38* (2012.01)
(Continued)

(52) U.S. Cl.
CPC ........ *G07C 9/00031* (2013.01); *G06Q 20/0457* (2013.01); *G06Q 20/327* (2013.01); *G06Q 20/3224* (2013.01); *G06Q 20/36* (2013.01);
(Continued)

(58) Field of Classification Search
CPC .......... G06Q 20/0457; G06Q 20/3224; G06Q 20/327; G06Q 20/36; G06Q 20/382; G06Q 20/40145; G06Q 90/00; G06Q 30/0258; G06Q 20/045; G07C 11/00; G07C 9/00031; G07C 9/00111; G07C 9/00119; G06K 7/0008; G07B 15/02
See application file for complete search history.

(56) References Cited

U.S. PATENT DOCUMENTS

| | | | | |
|---|---|---|---|---|
| 4,851,652 A | * | 7/1989 | Imran | G06K 7/065 235/382 |
| 2002/0140553 A1 | * | 10/2002 | Bachtiger | G07B 15/02 340/539.1 |

(Continued)

FOREIGN PATENT DOCUMENTS

EP    1510960 A1    3/2004

*Primary Examiner* — Sisay Yacob
(74) *Attorney, Agent, or Firm* — Karl F. Milde, Jr.; Eckert Seamans Cherin & Mellott, LLC

(57) ABSTRACT

A method and system for providing location-based services are proposed, wherein the objective is the determination of the authorization of a person to use location-based services using non-contact detection and the evaluation of media information from a customer medium, whereby the location of the customer medium is carried out based on the detection of the medium and where the media information of the customer medium is recorded based on an automatically implementable non-contact interaction between at least one reading device assigned one location and connected to computer and the customer medium, if the customer medium is within the range least one reading device, where the customer medium comprises an RF transceiver and communicates with the computer via at least one reading device in a predetermined frequency range, where location-based services are provided cases of a valid authorization, the provision of which depends on the detection of the customer medium via at least one reading device assigned to the location, and where the customer medium is controlled by a computer via least one reading device in such a manner that the energy consumption of the customer medium is minimized.

15 Claims, 1 Drawing Sheet

(51) Int. Cl.
*G06Q 20/36* (2012.01)
*G06Q 20/40* (2012.01)
*G06Q 20/04* (2012.01)
*G06Q 20/32* (2012.01)
*G06Q 90/00* (2006.01)
*G07C 11/00* (2006.01)

(52) U.S. Cl.
CPC ........ *G06Q 20/382* (2013.01); *G06Q 20/40145* (2013.01); *G06Q 90/00* (2013.01); *G07C 9/00111* (2013.01); *G07C 9/00119* (2013.01); *G07C 11/00* (2013.01)

(56) References Cited

U.S. PATENT DOCUMENTS

2008/0116264 A1* 5/2008 Hammad ............ G06Q 20/045
 235/382
2009/0065582 A1* 3/2009 Kon .................... G06K 7/0008
 235/439

* cited by examiner

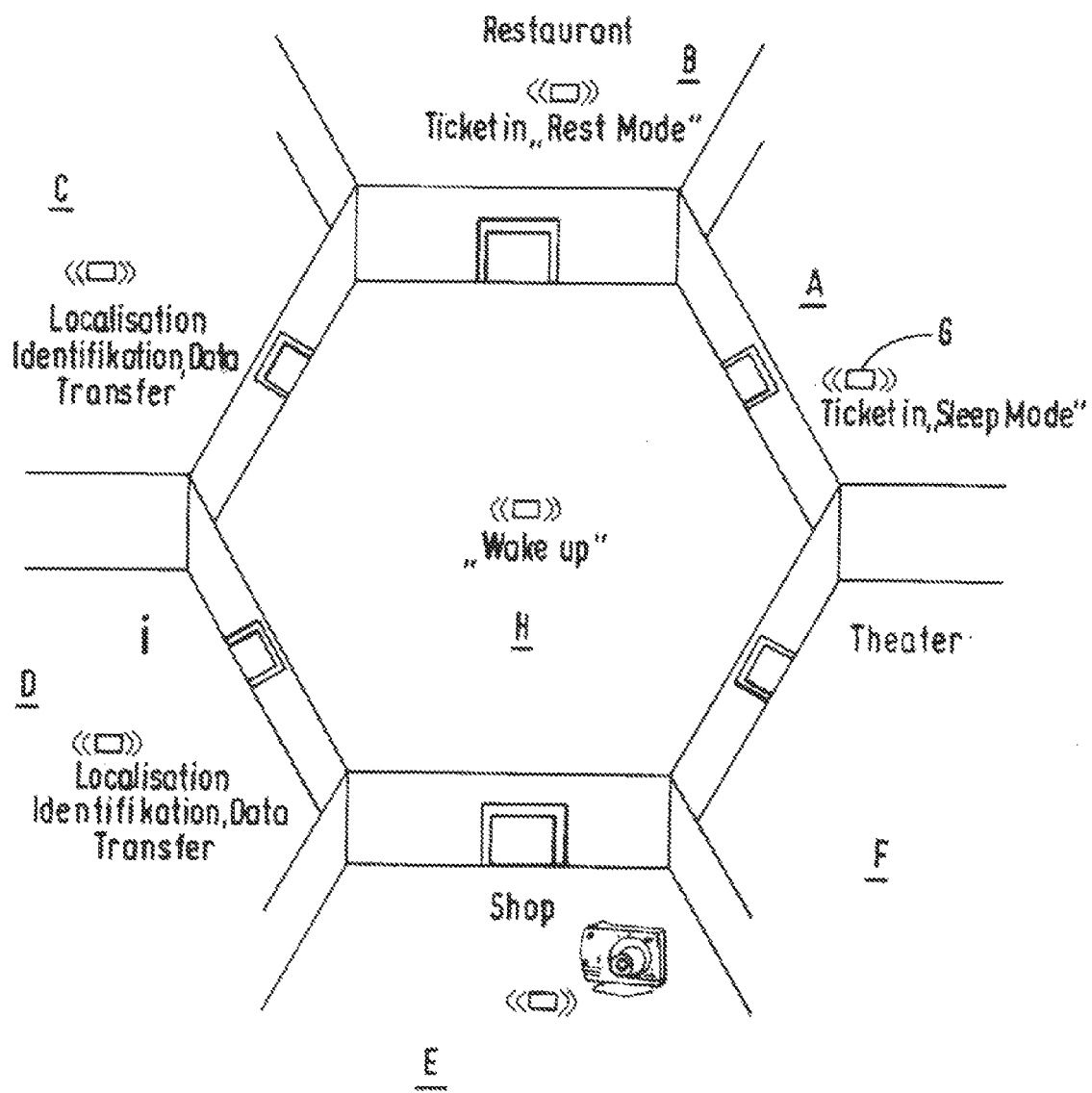

METHOD AND SYSTEM FOR PROVIDING LOCATION-BASED SERVICES

The present invention relates to a method for providing location-based services. Furthermore, the invention relates to a system for providing location-based services, in particular to a system for implementing the method according to the invention.

SUMMARY OF THE INVENTION

The present invention has taken the task as basis to specify a method for providing location-based services, whereby the implementation of the determination for authorization to use the location-based services and the provision of services occurs in a simple way with high spatial accuracy and without any action on the part of the person who would like to nee said services. In addition, in the process of implementing the method energy consumption should be minimized.

Furthermore, a system for providing location-based services should be specified, particularly a system for implementing the Method according to the invention, which is simple in structure and allows for the determination of authorization to use location-based services with low design cost. In addition, the present system, should feature a low energy consumption.

Accordingly, a method of providing location-based services is proposed, where part of the determination of the authorization for a person to use the location-based services is carried out on the basis of non-contact detection and the evaluation of the media information from a customer medium, where the localization of the customer the medium is carried out based on the detection of the customer medium and where the media information of the customer medium is recorded based on an automatically executable non-contact interaction between at least one reading device assigned to a location and connected with a computer and the customer medium if the customer medium is located within the range of at least one reading device, where the customer medium comprises an RF transceiver and communicates with the computer via at least one reading device in a predetermined frequency range.

The provision of location-based services which depend on the detection of the customer medium by at least one reading device assigned to a location are provided in the event of a valid authorization. Here, the customer medium is controlled by a computer via at least one reading device in such a way that the energy consumption of the customer medium is minimized.

In the event that the customer medium can be arranged with a preferably mobile device serving as data output and input device in or on the device for the purpose of data communication, or can toe connected with the device without contact, the device and the customer medium shall feature interfaces, which enable a connection between the customer medium and the device for the purpose of data transmission. The interfaces can be contacts, NFC or RFID interfaces, Bluetooth®-interfaces or other interfaces for data communication known from the state of the art. Here, the device is used as a data output and input device, where data exchange occurs between the customer medium and the device via the interface.

In the following, the expression "can be connected to a device" is used in the sense that the customer medium can be arranged in or on a device for the purpose of data communication or can be connected with the device without contact.

The system according to the invention accordingly comprises the customer media and at least one reading device for detecting the media information of the customer medium. At least one reading device is in turn connected with other components, such as to a computer in order to check the authorization to use the location-based services on the basis of the media information. In the event of a valid authorization, the corresponding location-based services will be provided, where devices required for this purpose are controlled by the computer. Alternatively, the evaluation of the media information can be done directly in the reading device. A reading device in terms of the invention is a device that on the one hand can read the data from the customer medium and on the other hand is suitable for transmitting data or data streams to the customer medium.

Furthermore, in the case that several reading devices are provided at one location, at least one central computer is provided which controls the reading devices and carries out the analysis and verification of the authorization. The provision of the services can also be controlled by the central computer, where the computer is connected with the devices required for this purpose via cables or without contact.

Location-based services can, for example, be the provision of additional information about the location, about the objects assigned to the location, about the objects located in the location or about the services offered in the location in visual, acoustic or electronic form. For example, the visitors of an exhibition can obtain information about the exhibits by means of the method according to the invention, as soon as he approaches, where the information can be displayed by means of the device in the event that the customer medium can be connected to a device. Here, the customer medium may be the admission ticket, if additional options have been booked.

The customer medium preferably features a semi-permanent memory for storing the information sent to the customer medium. Thus, this information can be displayed upon connection of the customer medium with a device.

In the event that the customer medium is connected to a device, the device features components, such as a display that can be configured as a touch screen and/or a speaker unit or a headphone connector. Furthermore, the device may feature a keyboard, which can be integrated into the display in the form of a touch keyboard.

The device may also have sensors, such as a tilt sensor or a proximity sensor. The device can be activated in the event of the existence of an authorization to use the location-based services via the customer medium. As part of a further development of the invention, the device may be a mobile phone or a tablet computer.

For example, the customer medium may feature a NFC-interface and be placed on a side of a device with NFC-interface. Here, the device is used as a data output and input device, where data exchange occurs between the customer medium and the device via the NFC-protocol. The NFC-interface may also allow a signing and encryption. A Bluetooth interface represents another way of communication between the customer medium and the device. Here, a "pairing" of the Bluetooth interface of the customer medium to the device can also be done via an NFC data exchange automatically without any action of the user, where the actual data exchange between the customer medium and the device is carried out via Bluetooth.

According to the invention, in addition to the detection and analysis of the media information of the customer medium, the signal strength can be detected, whereby the signal of the customer medium is received by at least one reading device, by which the distance between the customer medium and at least one reading device can be determined. In the event that the signal of the customer medium is received by multiple reading devices, a localization of the customer medium can be performed in this way or the location of the customer medium can be determined more accurately, by which location-based services can be provided with higher accuracy.

Alternatively or in addition to signal strength, the duration of the signal can be evaluated and by using this a distance measurement or in case of deployment of three reading devices a precise location can also be determined i.e. a localization of the customer medium. For this purpose, signals transmitted from the customer medium can be provided with a time stamp in order to determine the signal duration based using the reception time by at least one reading device.

Preferably, the customer medium has a card format, for example, an ISO card format.

The customer medium preferably comprises a first and a second antenna which are designed on a PCB substrate. The customer medium is preferably assigned to a person. The antennas of the customer medium can be implemented as dipoles, folded dipoles, "inverted F" antennas, quadruple antennas, similar patch antennas or antenna loops and coils.

Here, the first antenna is preferably designed in the range 13 MHz-10 GHz and is used as a wake-up antenna for receiving a wake-up signal when the customer medium is in a "sleep" mode. The wake-up signal is preferably transmitted as amplitude-modulated, and includes a predetermined signal sequence, where the signal from a wake-up antenna is amplified and demodulated by operational amplifier serving as a detection module, and is evaluated by a microprocessor partially activated in the "sleep mode", where in case a valid wake-up signal is detected, i.e. a signal with the proper sequence, the microprocessor is fully activated and the transceiver of the customer medium is turned on, whereby the customer medium goes into an active mode.

The operational amplifier is the only component of the customer medium that is fully active in the "Sleep" mode, and is configured in such a manner that it has minimum power consumption. In addition, only a part of the microprocessor is activated in the "sleep mode". Moreover, the customer medium also has an idle mode, in which only the microprocessor is active in order to control the transition into "Sleep" mode or into the active mode according to predetermined routines. The microprocessor of the customer medium therefore has different modes of activity.

The second antenna likewise receives and transmits preferably in the range of 13 MHz-10 GHz and is connected to an RF transceiver, where the transceiver can be activated only if the customer medium in active mode, thus minimizing the energy consumption of the customer medium. The bit rate of the transceiver is preferably 1 or 2 Mbit/s. Data communication with corresponding reading devices can be performed via the transceiver over multiple channels with slightly different frequencies in order to avoid collisions with external services in this way and to allow rapid contact.

In order to reduce a risk of disruption during data transmission, a continuous change of the data channels is enabled by the transceiver (frequency hopping). For example, three "advertising channels" can be used for data transmission via the second antenna in the 2.4 GHz band to make contact with a reading device, and five "communication channels" can be used for data communication with the reading device. Alternatively, the reporting and subsequent data transmission is done via "ultra wideband" communications. These cover a frequency range of at least 20% of the bandwidth with respect to the centre frequency or can utilize more than 500 MHz bandwidth.

The first and the second antennas are used for long-range data communication with at least one reading device for detecting the media information of the client medium, for reading out the data stored in the customer medium and/or for describing the customer medium and/or for transmitting a data stream, for example in the form of video—and/or audio files or streams to the customer medium. Long-range data communication in terms of the invention is a data communication with a range of more than one meter.

The customer medium therefore features a "sleep" mode, an idle mode and an active mode, where only the operational amplifier and a part of the microprocessor are activated in the "sleep"-mode. The microprocessor of the customer medium is largely turned off in "sleep"-mode and fully turned on in idle mode and active mode, where the transceiver is turned off in "sleep" -mode and in idle mode and is turned on only is active mode. In this way, the energy consumption of the customer medium is kept as low as possible.

The customer medium can be implemented as an active customer medium, where in this ease a battery, preferably a 3-volt battery is provided to provide electricity to the components. Optionally, the customer medium can feature an LCD display and an appropriate driver and/or a device for visual and/or acoustic indicator such as a low battery status or other data or conditions of the customer medium.

As part of further embodiments, the customer medium is designed in such a manner that it is charged with energy via an HF pulse, which is emitted from at least one reading device, thus the required energy can be taken from the field of the reading device end then can be operated autonomously for a predetermined time. For this purpose, the customer medium features a capacitor for storing energy and a corresponding switching circuit. The pulse is preferably a pulse in the UHF-range.

In the event that the customer medium does not feature its own power supply, the "wake-up" signal can additionally be included in the HF pulse. Furthermore, in the event that the customer medium is provided without its own power supply, that an HF signal is sent at regular predetermined time intervals by at least one reading device in order to energize the customer media within range.

Furthermore, in the event that the customer medium can be connected to a device, the customer medium can obtain the energy required for the operation from the device. In the case of NFC-coupling, this is achieved via the 13 MHz communication field. Over such a field, a battery of the customer medium can also be recharged constantly.

Furthermore, the customer medium can have an appropriately dimensioned solar module to charge the battery in this way. As part of a further development of the invention, the customer medium has means for entering a PIN which can be implemented as a numeric keypad and/or at least one biometric sensor, for example, a fingerprint sensor in order to check the authorization of the use of the customer medium by a person.

In the event that the customer medium can be connected to a device, inputs can be given via a keyboard or the sensors of the device. The forwarding to the customer medium is done via the interface for data communication with the customer medium.

If the customer medium is not located within range of a reading device of the system for providing location-based services at the beginning of the process, it is in a "sleep" mode, where no substantial electrical activity takes place in sleep mode, due to which the battery that supplies the customer medium with energy is hardly used if the customer medium has its own energy supply.

At least one reading device transmits a "wake-up" signal at regular intervals during a wake-up phase. In the case that several reading devices are provided, the central computer, which controls the reading device, transmits the "wake-up" signal at regular intervals, which is sequentially transmitted from all reading devices, which are connected to the central computer. If the customer medium receives this signal, this will lead to the activation of the customer medium and transition into the active mode in case of a "wake-up"—signal detected as valid, and thus to the exit of the medium from the sleep mode.

Subsequently, the data to calculate a session id are sent from the customer medium, which are received by at least one reading device and sent to the computer via a bus system, a WLAN or other network systems, via which at least one reading device is connected to a computer.

The calculation of the session ID is preferably based on the known "challenge-response" method. Accordingly, the computer responds upon receipt of the first data set by the customer medium with another data set. In each case, both data seta are offset with further information (algorithms, keys) only present in the customer medium and in the computer and used to determine the session ID. Information present only in the customer medium or in the computer is alien for an overhearing third party, so that with one session ID, one dataset known only to the customer medium and the computer is present. This is used for further safeguarding such as authentications. After calculating the session ID, the media information can be sent from the customer medium.

According to a variant of the invention, the communication between at least one reading device and the customer medium occurs as encrypted and optionally signed, where the encryption for each customer medium is different. In the event of a signature, a time stamp is used, which is incremented per communication, so that each message, which is additionally signed, constitutes a unique, secure dataset.

Here, a mutual authentication can be carried out as part of a further development of the invention before the start of communication, so that the customer medium is signed as known and authenticated, whereby a secure connection is established as part of the authentication between the easterner medium and at least one reading device or the computer connected to at least one reading device, so that the required information from the customer medium can be transmitted securely. The customer medium is uniquely recognized via the session ID, whereby the session id will be valid for the duration of a valid authentication and be independent from the other transferred information. In a transition from the active mode to the idle mode, the occurred authentication is not deleted, whereby the authentication is deleted upon a transition Into the sleep mode, and where if the customer medium has entered the sleep mode it can only be detected and registered with a renewed wake-up signal and subsequent renewed mutual authentication.

As part of a variant of the invention, the communication between the computer end the customer medium is done after the mutual authentication is encrypted and optionally signed where the signature and encryption is different for each customer medium and where the re-registration features a new, different encryption and possible signing after a re-authentication.

The customer medium features an integrated circuit connected to the microprocessor for realizing the authentication and encryption, which comprises at least one crypto-engine, where preferably three crypto-engines are included, for example, for GRAIN 128, GRAIN 128A, 3-DES or AES-128.

In the following, the method of the invention is elaborated for the case that authentication is performed and the communication between the computer connected to at least one reading device and the customer medium takes place under encryption. However, all the steps of the method can be carried out without authentication and without encryption/decryption as part of other embodiments. Furthermore, as part of a further embodiment of the invention, in which no encryption or authentication is provided, the session ID can be the media information of the customer medium, for example a biunique number that is immediately sent to the computer after the transition to the active mode.

Here, it is envisaged that the customer medium sends an encrypted media information after the authentication, which is received by at least one reading device and supplemented by the reading device ID and the signal strength, with which the signal has been received by the reading device and/or the duration of the data between customer medium and at least one reading device and forwarded to the computer assigned to at least one reading device. In the computer, the media information is decrypted and processed, whereby these are provided to the person, who is assigned to the customer medium, in the case of a present authorization to use the location-based services. The signal strength and/or the signal duration are required in order to enable a localization of the customer medium. By means of the media information, which may be a biunique number, the customer medium can be biuniquely identified, whereby it can be determined on the basis of media information, whether, for example, an authorization is present for the use of a service.

For example, location-based information can be sent to the customer medium via the reading devices. In the case of a museum or a trade show booth, information can be sent in the form of video and/or audio files, or a video—and/or audio data stream to the customer medium, which can be transferred to the device in the case of a connection of the customer medium with a device via the interface and displayed or played by the device, which refer to an exhibit or a group of exhibits, to which at least one reading device is assigned or the trade show booth, to which the reading device is assigned. By increasing the number of reading devices, the spatial resolution can be increased, by which the services that relate to a vary small site can he offered.

In the event that several reading devices have received the media information, location-based services are provided to the location next to the customer medium, whereby the next location is determined based on the signal strength with which the reading devices have received the media information and/or on basis of the duration of data between customer medium and reading device. For example, information about an exhibit is provided in the case of a museum, to which the reading device that has received the strongest signal of the customer medium is assigned.

Furthermore, the location-based service may be the activation of a display device, for example, an information terminal at the location, whereby the display device is activated upon a valid authorization if the customer medium is detected by a reading device assigned to the display device and an authorization exists.

As part of a further development of the method, after the evaluation of media information, an acknowledgement is sent which contains a time stamp and which, following the transition into an idle mode, has a predetermined duration until the next contact to send the encrypted and signed media information to the computer via at least one reading device. Subsequently, the customer medium is put into idle mode for the predetermined duration, which can result either immediately upon receipt of acknowledgement, or after a predefined period of time which is contained in the signal containing the acknowledgement, or after transmission of location-based information, or after the completion of using the services or after a new signal after the completion of using the services.

The customer medium receives the acknowledgement and enters the idle mode when the use of location-based services does not require the operation of the customer medium, which for example happens when an activation of a location-specific display device, immediately after receiving the acknowledgement in which the energy consumption is very low, where the occurred authentication is not deleted upon switching to idle mode. If the utilization of the location-based services requires the operation of the customer medium, the customer medium enters the idle mode, after a predefined period of time, after transmission of location-based information, after the completion of using the services or after a new signal after the completion of using the services.

After the predetermined time to the next contact after the transition into the idle mode, the customer medium enters the active mode and sends its media information as encrypted and optionally signed to the computer via at least one reading device. This can show the location of the customer medium in order to provide other location-based services, e.g. information about other trade show booths at a trade show or an exhibit in an exhibition in this way.

By exiting the idle mode and transitioning to the active mode after the first predetermined time and retransmission of the media information, the customer medium is "tracked", because based on the signal strength and/or the duration of the signal and a location information is obtained, which is used in order to provide location-specific services.

The corresponding signal of the customer medium is detected by at least one reading device and forwarded to the computer, whereby the receipt of the identity of the customer medium is answered with the re-transmission of an acknowledgement, which is generated by the computer and sent by the reading device. Furthermore, the location-based services, which correspond to the location to which at least one reading device is assigned, are provided.

After receipt of acknowledgement, the customer medium is put in idle mode, this can happen either immediately upon receipt of acknowledgement or after a predetermined period of time, or after transmission of location-based information, or after the completion of using the services or after a new signal following the completion of using the services, from which it returns after the predetermined time interval in order to once again be reported to the computer via the reading devices with the encrypted art optionally signed identity. She incremented time stamp per response of the reading device is used in accordance with a variant of the invention in addition to sorting tasks of the signature calculation, since thereby the uniqueness of. the signature is ensured.

The predetermined time until the next contact and the predetermined period of time for the transition into the idle mode after receipt of the corresponding signal can be adjusted dynamically to accommodate, for example, the type of location-based services in this way. For example, the time period until the next contact should be short in the case of an exhibition or a trade show and take the average time of stay of a visitor in front of an exhibit or at a trade show booth into account.

Furthermore, the predetermined period of time for the transition into idle mode after receipt of the corresponding signal is measured as a function of the services to be provided in such a manner that the customer medium remains active and ready to receive or transmit, until the location-based services have been used. For example, until a video file containing information about an exhibit has been completely transmitted to the customer medium.

The acknowledgement is encrypted individually for each customer medium or device, thereby ensuring that only that customer medium or device which has transmitted its identity receives the acknowledgement. In this way, only this one customer medium is put into idle mode, or in other words only the authorized customer medium receives additional information.

The procedure described above is repeated until the customer medium switches into the sleep mode, which takes place if after a predetermined number of attempts it is not possible for the customer medium to obtain an acknowledgement of the transmission of encrypted media information from the computer via at least one reading device. In the scope of the procedure, this happens when the person to whom the customer medium is assigned leaves the location.

In the event that the customer medium has been put in a sleep mode, it can only be detected and registered with a renewed wake-up signal and subsequent renewed mutual authentication, as already explained, where this renewed registration features new and different encryption end optional signature. Consequently, a specific encryption and signature is only valid for one customer medium and one registration. The registration lasts as long as the customer medium is not put in a sleep mode. A wake-up signal can be processed only in sleep mode.

The wake-up signal is a signal, e.g. in the 2.4 GHz range, and is sent to one of possibly several, preferably three "advertising channels". After a recognized valid wake-up signal and transition of the customer medium to active mode, the data used to calculate the session ID are likewise sent to one of the "advertising channels", by which the customer medium suggests a communication channel for the next data exchange. The underlying algorithm is designed in such a manner that interferences with the communication channels can toe stochastically prevented.

By means of the wake-up signal and the resulting automatic activation of the customer medium and the subsequent communication with at least one reading device, the acquired location-based services are provided automatically.

Furthermore, it can be provided that at predetermined sites, such as at the exits of spatially delimited sites, in which location-based services are provided, within the site, in which the location-specific services are provided (i.e. the site where the system according to the invention is implemented), e.g. at the exit of a section of a trade show or an exhibition room of a museum or at the entrances of spatially delimited locations within the site, in which the location-specific services are provided, i.e. the site where the system according to the invention is implemented, in which no location-specific services are offered, such as at entrances of restaurants at trade show or museum shops, at least one reading device is arranged, where if such a reading device receives the media information from the customer medium, a command is sent from the system to the customer medium, which puts the customer medium in the idle mode for a second predetermined time, which corresponds to the average length of stay outside the spatially delimited sites, in which the location-specific services are provided or to the average length of stay in the sites, in which no location-specific services are offered. In this way, the energy consumption of the customer medium is kept low.

Furthermore, at the exits of the sites in which the location-specific services are offered, i.e. the site where the system according to the invention is implemented, at least one reading device can be arranged which after receiving the media information from the customer medium sends a system-generated commend that puts the customer medium in a "sleep"-mode and in this manner reduces the energy consumption of the customer medium. As part of a further development of the invention, the customer medium may additionally be used as prepaid medium or electronic wallet, which can be charged for this purpose with a specific amount of money, which can be electronically debited via the communication with the computer via at least one reading device. By this means, the items offered in the location or the location-based services can be acquired by means of the communication with the computer.

The system according to the invention can be used, for example, in a museum, at trade shows, amusement parks, etc.

In an advantageous manner, a stationary camera can be activated by at least one reading device assigned to the stationary camera at an amusement park, museum or in front of a e.g. tourist attraction in order to take a picture of the person assigned to the customer medium before a predetermined background, where this photo is sent to the customer medium in digital form via at least one reading device assigned to the camera, after the detection of the customer medium and upon valid authorization to use the service, if the corresponding option is booked or if the customer medium is configured as an electronic wallet, in which case a corresponding amount is debited from the customer medium. If the customer medium can be connected with a device, e.g. with a mobile phone, the photo can be transferred to the device via the interface between the customer medium and the device and stored and displayed there. Alternatively, the photo can be stored in a central location and accessed from there later after appropriate authentication.

A variety of location-based services can be offered and booked via the detection of the customer medium. For example, information and offers, which can be booked or purchased by menu control when the customer medium is configured as an electronic wallet can be sent after the detection of the customer medium by at least one reading device assigned to a trade show booth, a shop window, a product or service and valid authorization with the customer media. In this scenario the device connected with the customer medium is used as a data output and-input device for display and booking. For example, the person assigned to the customer medium can be informed in the case that the customer medium is detected by the reading device assigned to a cinema, when and with what film the next show will start, and whether seats are available, which can then be booked.

Furthermore, a customer medium according to the invention can be used by a system according to the invention as a means of identification for persons, if it is biuniguely assigned to a person. In the case that it has a biometric sensor, for example, a fingerprint sensor, a misuse can be avoided. In this example it can be envisaged that after receiving the wake-up signal, the communication between the customer medium and the reading devices can only begin after the evaluation of the fingerprint or other biometric feature in the customer media.

In addition, the method according to the invention can be used for automated issuing of goods, tickets or boarding passes, where these are issued after the detection of the customer medium by at least one reading device assigned to the automatic vending machine and upon valid authorization to use the goods, tickets or boarding passes. Alternatively, the amount corresponding to the goods, tickets or boarding passes can be debited from the customer medium after detecting the customer medium, if the customer medium is configured as an electronic wallet, where the goods, tickets or boarding passes are subsequently issued. Here, the automatic vending machine is connected to the computer of the system according to the invention.

For a full understanding of the present invention, reference should now be made to the following detailed description of the preferred embodiments of the invention as illustrated in the accompanying drawing.

BRIEF DESCRIPTION OF THE DRAWINGS

FIG. 1 is a representational diagram of a museum incorporating the present invention.

DETAILED DESCRIPTION OF THE PREFERRED EMBODIMENT

A schematic plan view of a museum is shown in the figure, in which the system according to the invention is implemented. The museum comprises an entrance A, a restaurant B, an exhibition room C, an information room D, a museum shop E and a cinema F.

When a visitor enters the museum with the customer medium that was assigned to him, the customer medium G is in the area of the entrance A, and for example, is in a "sleep" mode in front of the entrance. If the visitor passes through the entrance and is located in the foyer H, the customer medium G receives the wake-up signal, which is emitted from at least one reading device installed in the foyer at regular intervals. The wake-up signal is broadcast by all reading devices of the system in order to ensure that a customer medium G erroneously put in "sleep" mode, for example due to an inadvertent shielding, can be activated again.

Upon receipt of the "wake-up" signal from the customer medium G, the customer medium G is activated upon recognition of a valid "wake-up"-signal and leaves the "sleep" mode. The customer medium G is now in active mode. Subsequently, the data to calculate a session ID are sent from the customer medium G, which are received by at least one reading device and transmitted to the central computer via a bus system, via which at least one reading device is connected to a central computer that controls the system according to the invention.

Before the beginning of the communication between customer medium G and at least one reading device or the central computer, a mutual authentication is carried out, so that the customer medium G is tagged as known and authenticated. The customer medium is uniquely recognized via the session ID, where the session id is valid for the duration of a valid authentication and is independent from the other transferred information.

After successful authentication, the customer medium G sends an encrypted media information, which is received via at least one reading device and supplemented by the reading device ID and signal strength, with which the signal has been received by the reading device or the duration of the signal between customer medium and reading device and is forwarded to the central computer connected with at least one reading device. In the computer, the media information is decrypted and processed, where this is provided to the person who is assigned to the customer medium in the case of a present authorization to use the location-based services and where the device connected with the customer medium G e.g. via NFC or Bluetooth® is used as a data output and -input device for displaying or playing information, which can be audio or video files or streams. In this case services corresponding to the next location (the nearest exhibit) are provided, whereby the next location is determined based on signal strength with which the reading devices have received the media information and/or based on the duration of data between customer medium G and reading device.

In the event that several reading devices have received the media information of the customer medium G, location-based services are provided to the location next to the customer medium G, whereby the next location is determined based on the signal strength with which the reading devices have received the media information and/or on the basis of the duration of data between customer medium and reading device. For example in the case of a museum, information about an exhibit is provided to the reading device that has received the strongest signal from the customer medium G.

After the evaluation of media information, an acknowledgement containing a time stamp and a first predetermined time after the transition into idle mode until the next contact to send the encrypted and optionally signed media information to the central computer via at least one reading device is broadcast via at least one reading device. Subsequently, the customer medium G is put into idle mode, whereby this can happen either immediately upon receipt of acknowledgement or after a predefined period of time, or after transmission of location-based information, or after the completion of using the services or after a new signal after the completion of using the services.

After the predetermined time until the next contact after the transition into the idle mode, the customer medium G enters the active mode and sends its media information as encrypted and optionally signed to the central computer via at least one reading device. By exiting the idle mode and the during the transition to the active mode after the first predetermined time and retransmission of the media information, the customer medium is "tracked", because based on the signal strength and/or the duration of the signal, a location information is obtained, which is used to provide location-specific services, e.g. information about the exhibit in the exhibition room C.

The corresponding signal of the customer medium is detected by at least one reading device and forwarded to the computer, where the receipt of the identity of the customer medium is answered with the re-transmission of an acknowledgement, which is generated by the computer and sent by the reading device. Here, depending on the location where the customer medium is located, the corresponding services are provided, as already elaborated.

After receiving the acknowledgement, the customer medium G is put into idle mode again, from which it returns after the specified time interval in order to be reported once again to the central computer with the encrypted and optionally signed identity via the reading devices. As already explained, the customer medium G can be put into idle mode either immediately upon receipt of acknowledgement, after a predefined, dynamically adaptable period of time, after transmission of location-based information, after the completion of using the services or after a new signal after the completion of using the services.

The predetermined time until the next contact can be dynamically adjusted, for example, in order to allow for the type of the location-based services. For example, when visiting an exhibition in a museum the duration is short and takes into account the average time of stay of a visitor in front of an exhibit and/or the user's paths from one exhibit to the next. The dynamic adjustment of the predetermined time until the next contact can feature a dependency on the current location, in order to take the known average length of stay in front of a specific exhibit into account, for example at an exhibition.

The acknowledgement is encrypted individually for each customer medium G, thereby ensuring that only that customer medium or device receives the acknowledgement, which has transmitted its identity. In this way, only this one customer medium G is put into idle mode or in this way only the authorized customer medium G receives the services in the form of additional information.

The procedure described above is repeated until the customer medium G switches into the sleep mode, which takes place if it is not possible for the customer medium G after a predetermined number of attempts to obtain an acknowledgement of the transmission of encrypted media information from the computer via at least one reading device. In this case, the customer medium G is located outside of the museum building and the visitor has left the museum.

If the visitor visits the museum restaurant B after a visit to the exhibition room C, the customer medium G is detected toy at least one reading device arranged at the entrance of the restaurant B, where if the media information from the customer medium G is received by at least one reading device, a command is sent from the system to the customer medium G, which puts the customer medium G in the idle mode for a second predetermined time, which corresponds to an average length of stay in the restaurant B. In this way, the energy consumption of the customer medium G is kept low.

After the second predetermined time elapses, the customer medium G re-enters the active mode, and sends the media information that is received, for example by a reading device in the information room D, by which the customer medium G is localized. Here, upon a valid authorization, the system sends the desired information to the customer medium that can be displayed on a device connected with the customer medium G. By a device used as data output and -input device, the user can book offers, such as tickets to a show at the cinema F of the museum, where in the case that these are not already paid during the acquisition of the customer medium and if the customer medium G is configured as an electronic wallet, the payment is made by debiting from the customer medium G.

If the visitor then enters the cinema F, the customer medium G is detected by at least one reading device arranged at the entrance of the cinema F and it is verified on the basis of the transmitted media information, whether an authorization to the cinema is present. If this is not the case, a visual and/or acoustic alarm is triggered. Alternatively, after evaluation of the authorization in cases of a valid authorization, an access control device can be activated in order to enable the passage of the visitor to the cinema room. Subsequently, a signal can be sent to the customer medium G via at least one reading device to set the customer medium G to the idle mode for the duration of the show. After this predetermined time, the customer medium re-enters the active mode.

As an alternative to putting the customer media of the persons present in the cinema hall into the sleep mode, analogous to the previously described procedure, the customer media can toggle between the idle mode and the activate mode at predetermined intervals, which allows information about the number of visitors in the cinema to be obtained and in this way the number of empty seats can be determined, so that this information can be displayed to the visitors in the information room. With a corresponding large number of reading devices, the seat occupancy can also be determined.

After the visit to cinema is completed, the customer medium G is in the active mode and the visitor in this example can, for example, enter the museum shop E. Here, if the corresponding option is prebooked or if the customer medium G is configured as an electronic wallet, after the detection of the customer medium G by at least one reading device assigned to a stationary camera and upon valid authorization to use the service, the stationary camera can be activated in order to take a photo of the person assigned to the customer medium G in front of a predetermined background, whereby this photo is sent to the customer medium G in digital form via at least one of the reading device assigned to the camera or is stored on a server for viewing later. If the customer medium G is connected with a device, e.g. with a mobile phone, the photo can be transferred to the device via the interface between the customer medium G and the device and stored and displayed there.

If the visitor leaves the museum building, the customer medium G switches to the sleep mode, if it is not possible after a predetermined number of attempts for the customer medium G to obtain an acknowledgement of the transmission of encrypted media information from the central computer via at least one reading device after the last predetermined time.

There has thus been shown and described a novel method and system for providing location-based services which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

The invention claimed is:

1. A method for providing location-based services, wherein a determination of an authorization, of a person to use the location-based services is accomplished using non-contact detection and evaluation of a media information of customer medium, where a localization of the customer medium is determined based on the detection of the customer medium and where the media information of the customer medium is recorded based on an automatically implementable non-contact interaction between at least one reading device assigned to a location and connected to a computer and with the customer medium, if the customer medium is within range of the at least one reading device, whereby the customer medium comprises an RF transceiver and communicates with the computer via the at least one reading device in a predetermined frequency range, whereby the location-based services are provided in case of a valid authorization, the provision of which depends on the detection of the customer medium via the at least one reading device assigned to the location, and where the customer medium is controlled by the computer via the at least one reading device in such a manner that the energy consumption of the customer medium is minimized; wherein at the beginning of the method, the customer medium is in a sleep mode outside the range of the at least one reading device, where no significant electrical activity takes place in the sleep mode, by which a battery that supplies the customer medium with power is not used in the case of an own power supply of the customer medium, where the at least one reading device sends a wake-up signal at regular intervals as part of a wake-up phase, where if the customer medium receives the wake-up signal, it leads to the activation of the customer medium upon a valid detected wake-up signal and its transition into an active mode, whereby subsequently a data to calculate a session ID are sent from the customer medium, which are received by the at least one reading device and sent to the computer, whereby the customer medium sends the media information, which is received via the at least one reading device and supplemented by a reading device ID and a signal strength, with which the media information has been received by the at least one reading device and a duration of the data between the customer medium and the at least one reading device is forwarded to a central computer connected with the at least one reading device, whereby the media information is processed in the central computer and provided in the case of a present authorization to use the location-based services, where after evaluation of the media information an acknowledgement signal containing a time stamp and a predetermined duration until the next contact is broadcast after transition to the sleep mode to transmit the media information to the computer via the at least one reading device, whereby the customer medium is subsequently shifted to an idle mode for the predetermined duration, in which only a microprocessor of the customer medium is active in order to control the transition into the sleep mode or into the active mode, where the shift to the idle mode is done either immediately upon receipt of the acknowledgement signal, after a predetermined period of time that is contained in the acknowledgement signal, after transmission of location-based information, after a completion of using the location-based services or after receiving a new signal after the completion of using the location-based services, where the customer medium enters the active mode after the predetermined duration until the next contact after the transition into the idle mode and sends its media information to the computer via the at least one reading device in order to enable a further localization and where the steps of transmitting the acknowledgement signal by the computer, including the time stamp and the predetermined duration until the next contact after the transition into the idle mode to send the media information to the computer and to repeat the transmission of the media information by the customer medium after the predetermined time until the next contact after the transition into the idle mode until the customer medium enters the sleep mode, which takes place if it is not possible for the customer medium after a predetermined number of attempts to receive an acknowledgement of the transmission of the media information from the computer via the at least one reading device.

2. The method for providing location-based services according to claim 1, wherein for the purpose of data communication with a device, the customer medium can be arranged in or on the device or can be connected with the device without contact, whereby the device is used as a data output and input device and where the data transfer between the customer medium and the device occurs via an interface between the customer medium and the device.

3. The method for providing location-based services according to claim 1, wherein the customer medium is also used as an electronic wallet, where it can be loaded with a certain amount of money, which can be electronically debited as the result of communication with the computer via the at least one reading device.

4. The method for providing location-based services according to claim 1, wherein as the location-based services, information about a location, information about objects located in a location or assigned to a location, information about services offered in a location are transmitted in an electronic form, in the form of video and/or audio files, or a video and/or audio data stream to the customer medium, to which the at least one reading device is assigned, which in the case of a connection of the customer medium with a device via the interface to the device are transferred and displayed or played by the device.

5. The method for providing location-based services according to claim 1, wherein as the location based services, an automated issuing of goods, tickets or boarding passes along with a valid authorization to use said goods, tickets or boarding passes is carried out or is carried out in the event that the customer medium is additionally used as an electronic wallet after debiting the sum of money from the customer medium, following the detection of the customer medium by the at least one reading device assigned to an automatic vending machine.

6. the method for providing location-based services according to claim 1, wherein after detection of the customer medium by the at least one reading device assigned to a stationary camera, and upon a valid authorization to use said location-based service, or in the case that the customer medium is additionally used as an electronic wallet, the stationary camera is activated after debiting the sum from the customer medium in order to take a picture of the person who is assigned to the customer medium in front of a pre-specified background, where this photo is sent to the customer medium in a digital form via the at least one reading device assigned to the stationary camera or stored centrally on a server.

7. The method for providing location-based services according to claim 1, wherein the localization of the customer medium is determined based on the signal strength, with which the at least one reading device has received the media information and/or based on the duration of data between customer medium and the at least one reading device.

8. The method for providing location-based services according to claim 1, wherein at the exits of spatially delimited locations within a site, in which the location-based services are provided or at entrances of spatially delimited locations within the site, in which the location-based services are provided, in which no location-based services are offered, the at least one reading device is arranged, where if the at least one reading device receives the media information from the customer medium, a command is sent by a system to the customer medium that puts the customer medium into the idle mode for a second predetermined time which corresponds to an average length of stay outside the spatially delimited locations, in which the location-based services are provided or the average length of stay in the site, in which no location-based services are offered.

9. The method for providing location-based services according to claim 1, wherein the at least one reading device is arranged at the exits of a site, in which the location-based services are offered, which sends a system-generated command to the customer medium after receiving the media information from the customer medium, which puts the customer medium into the sleep mode in order to reduce the power consumption of the customer medium.

10. The method for providing location-based services according to claim 1, wherein after transmission of the data to calculate the session ID from the customer medium, the authentication is carried out between the computer and the customer medium, so that the customer medium is marked as known and authenticated, whereby the occurred authentication is not deleted in the transition from the active mode to the idle mode, where the authentication will be deleted upon the transition to the sleep mode, wherein if the customer medium has entered the sleep mode, it can be detected and registered only with a renewed wake-up signal and subsequent renewed mutual authentication.

11. The method for providing location-based services according to claim 10, wherein after the completion of the mutual authentication, the communication between an on-board unit and the customer medium occurs as encrypted and optionally signed, where the encryption and signature is different for each customer medium and where the re-registration features a new, different encryption and possible signature after a re-authentication.

12. A system for providing location-based services, in particular that implements the method according to claim 1, which comprises at least one reading device assigned to a location and connected to a computer and customer media, which communicates with the computer via the at least one reading device in a predetermined frequency range, where the customer medium comprises a first and a second antennas for long-range data communication, an integrated circuit comprising at least one crypto-engine, a microprocessor connected to the integrated circuit or integrated into the integrated circuit, an operational amplifier and an RF transceiver connected to the second antenna, where the first antenna is used as a wake-up antenna to receive an amplitude-modulated wakeup signal if the customer medium is in a sleep mode, whereby the wakeup signal received from the wake-up antenna by the operational amplifier serving as a wake-up detection module is demodulated and amplified and processed by the microprocessor partially activated in the sleep mode and where the microprocessor is completely activated in the event of the wake-up signal detected as being valid, by which the customer medium enters an active mode, and where the operational amplifier is the only component of the customer medium that is fully active in the sleep mode, whereby the customer medium features an idle mode, in which only the microprocessor is active, in order to control a transition into the sleep mode or into the active mode according to a predetermined routines, where only the operational amplifier and a part of the microprocessor are activated in the sleep mode, where the microprocessor is turned on in the idle mode and the active mode and where the RF transceiver is turned off in the sleep mode and the idle mode and only turned on in the active mode, thus minimizing the energy consumption of the customer medium.

13. The system for providing the location-based services according to claim 12, which is implemented as an active customer medium, where it comprises a battery for a power supply of the components.

14. The system for providing location-based services according to claim 12, wherein the customer medium is designed in such a manner that it is charged with energy via an HF-pulse, and then can operate autonomously for a predetermined time.

15. The system for providing location-based services according to claim 12, wherein the customer medium is connected to a device serving as a data output and input device, where the customer medium can be arranged in or on the device or can be connected with the device without contact.

* * * * *